Nov. 15, 1960   R. B. WATROUS   2,959,963
FLUID FILLED, FORCE BALANCE METER
Filed June 13, 1956
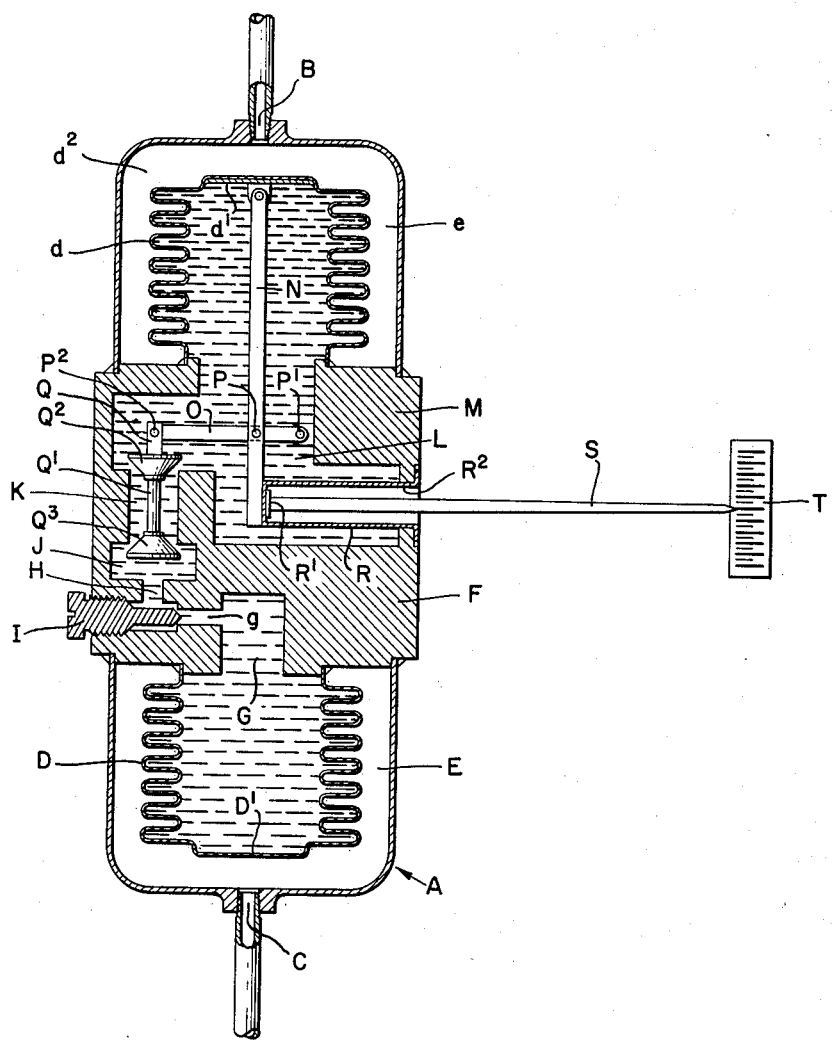
*INVENTOR.*
ROBERT B. WATROUS
BY Arthur H. Swanson
ATTORNEY.

United States Patent Office 2,959,963
Patented Nov. 15, 1960

2,959,963

FLUID FILLED, FORCE BALANCE METER

Robert B. Watrous, Philadelphia, Pa., assignor to Minneapolis-Honeywell Regulator Company, Minneapolis, Minn., a corporation of Delaware Filed June 13, 1956, Ser. No. 591,145

2 Claims. (Cl. 73—407)

The general object of the present invention is to provide a novel and useful fluid filled meter mechanism. The mechanism which I have devised for the purposes of the present invention, is characterized by the novel provisions employed to insure positive overload protection, and to variably damp the meter mechanism. In the preferred form of the invention, two liquid filled tubular bellows elements are arranged in end-to-end relation with the open end of each bellows normally in communication with the other bellows and associated with provisions for closing communication between the two bellows elements on a predetermined increase in the pressure on either bellows relative to the pressure on the other bellows. When an overload pressure applied to the outer surface of either bellows sufficiently exceeds the pressure applied to the other bellows, communication between the two bellows elements is interrupted. The liquid in the bellows subjected to the overload pressure then serves to support the bellows walls, thereby providing protection against distortion and consequent bellows damage. In such case, further increase in the overload pressure acting on the closed bellows increases the pressures inside and outside of that bellows and thereby normally prevents injury to that bellows. With this arrangement the bellows may be thin walled and thus provide a higher degree of sensitivity to changes in the applied differential pressures than otherwise would be attainable.

During normal operation, travel of the bellows is not sufficient to close communication between the two bellows. Although the travel of the bellows is small, an accurate indication of the bellows travel and thereby of the difference in pressures applied to the bellows end walls may be obtained by a force actuated means that will amplify the aforementioned bellows motion.

It is a specific object of the present invention to provide the aforementioned type of meter with a force multiplying beam means that will very rapidly stop the flow of fluid from passing from one bellows to another whenever an overload pressure is applied to either bellows. Amplification of the bellows motion with such a force multiplying means has also the added advantage of easier setting of the valve clearance. During normal operation the flow of fluid from one bellows to the other is also regulated by a variable restrictive connection between the two bellows.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

The one figure of the drawing illustrates a liquid containing instrument housing or casing A which is closed except for liquid inlets B and C adjacent opposite ends of the housing. While the instrument housing is shown as vertically disposed and circular in form, as is ordinarily convenient, the form and disposition of the housing may be varied when and as conditions make desirable. As shown, a lower bellows element D having a movable lower end wall D' adjacent and somewhat above the inlet C is movable toward and away from the latter as operating pressure conditions vary. Fluid is normally maintained under pressure in a chamber E which surrounds the lower bellows element and bears against outer sides of the walls D and D'. The upper end of the bellows element D is attached to the under side of a lower partition element F. The latter may be secured in any suitable manner to the cylindrical outer wall of the casing A. The partition element F is shown as formed with an upwardly extending recess G at its under side and with a lateral passage $g$ through which the recess G communicates with a vertical passage H in an upper portion of the partition element F. A screw I extends horizontally through the outer casing wall A and adjacent portion of the partition element F. The inner end portion of the screw I is tapered and of reduced diameter and extends into and variably throttles the passage $g$, and thereby restricts the flow through that passage and through the vertical port or passage H which has its lower end in communication with the inner end of the passage $g$.

The port H opens upward into a vertical chamber J formed in an adjacent portion of the partition F. The chamber J is normally in communication with a vertical channel K which extends upward through an upper end portion of the element F and opens into a chamber L. As shown, the chamber L extends across the space between the partition wall F and a second partition wall M above the wall F. The wall M is formed with a central opening through which the chamber L is in free communication with the interior of the upper bellows wall $d$ and end wall $d'$. The lower end of the wall $d$ is rigidly connected to the partition wall M. The bellows $d$ may or may not have its axis in alignment with the axis of the bellows D. The bellows $d$ is surrounded by a liquid containing space $d^2$ into which the inlet B opens.

A rod or thrust bar N depends centrally from the under side of the bellows end wall $d'$, and is pivotally connected to a horizontal bar or lever O by a pivot P. The lever O has a short end portion connected to a horizontal pivot P' mounted in a lower portion of the upper wall M. The opposite end P² of the lever O is shown as directly above the axis of the passage K and suspending a valve member Q. The latter comprises a central rod Q' extending through the channel J, and upper and lower conical members Q² and Q³. The conical ends of the members Q² and Q³ extend into the opposite ends of the channel K, but the outer ends of the members Q² and Q³ are larger in diameter than the passage K. The members Q² and Q³ may be simultaneously lowered by the lever O into the position in which the channel K is closed at its upper end by the conical member Q² when the lever end P² is depressed. When the lever end P² is raised to its maximum extent, the upper end of the channel K will be wide open, but the lower end of the channel K will then be closed by the conical element Q³.

As shown, the portion of the rod N below the pivot P is connected to the closed inner end R' of a flexible tubular element R. The outer end R² of the element R is open and is anchored in the cylindrical wall A. As ordinarily arranged, the axis of the element R will be horizontal when the fluid pressures in the upper portion of the chamber J and in the lower portion of the chamber L are approximately equal. Changes in the fluid pressures in the chambers $e$ and E cause the center of the inner end of the element R to be moved up or down to a level respectively above or below the longitudinal axis of the tube R as is shown in the drawing. A horizontal rod or bar element S, extends into the element R to the inner end of the latter. As shown, the element S is of greater length than the tube R, and is transverse to and has its inner end rigidly connected to the closed inner end R' of the tube R which in turn is connected to the rod N.

In consequence, the rod S extends centrally through and out of the member R when the element end R' is in an intermediate position so that the rod S and the tubular element R are parallel to one another. When the bellows end wall D' is moved away from its intermediate position, the inner end of the tube R is bent upward or downward away from the level position of the latter. An up or down movement of the bar N then moves the rod S up or down relative to the center of the open outer end $R^2$ of the tube R. In consequence, the varying up and down positions of the outer end of the member S resulting from the up and down movements of the bar N are indicative of the varying positions of the outer end of the rod S, and may well be shown as illustrated by a vertical scale T.

The fluid filled system in the casing A provides positive overload protection and variable damping of the meter mechanism Q. When overload pressure is applied downward to the end of the bellows $d$, the upper end $d'$ of this bellows $d$ moves down and through lever O, and rod Q moves the valve $Q_2$ down until it closes the passage K. When the valve is shut down the incompressible fluid inside the upper bellows chamber $d$ is thus prevented from passing into the interior of the lower bellows. Any further increase in overload pressure builds up a corresponding pressure inside the bellows $d$, since the fluid is incompressible, and thus that bellows is protected. Overload on the high pressure side of the valve $Q^3$ elevates the latter and thus protects the high pressure bellows D. During normal operating travel of the bellows, the valves $Q^2$ and $Q^3$ do not close.

When a differential pressure is applied in the form of a force to the upper end of the rod N the pivot P of the lever O will be moved through a very small arc about the pivot P'. However, the magnitude of movement that will result at the valve end $P^2$ of this lever O will be greatly amplified over the movement that is occurring at the pivot P as the point $P^2$ is caused to move through a greater arc than point P whenever such a force is applied by rod N. The lever O thus permits the bellows motion to be amplified at the valve and also permits easier setting of the valve clearance. The flow of fluid from one bellows to the other is restricted by the use of the variable restriction screw I. Although the travel of the bellows is small, an accurate indication of the bellows travel and thereby of the difference in pressures applied to the bellows end walls may be obtained by suitable amplification of the bellows motion. Amplification of the bellows motion provides the added advantages of easier setting of the valve clearance. The flow of fluid from one bellows to the other is thus subjected to regulation by the variable restrictive connection between the two bellows.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A liquid filled system comprising a pair of flexible fluid filled bellows elements each enclosing an expansible bellows chamber normally in variably restricted communication with the other bellows chamber, a lever within one of said chambers supported at one end for deflection on a stationary support, a thrust bar operably connnected at one end to the interior of one end of one of said expansible bellows and at its other end to said lever at a position spaced from its supported end to deflect said lever in accordance with the difference in a fluid pressure being applied to the external surface of each of said bellows elements, a separate chamber at the outer side of each bellows element, a valve means pivotally connected to the other non-supported end of said lever and being actuated by said lever upon a predetermined difference in the magnitude of said fluid pressures to interrupt communication between said bellows element, and means connected to said thrust bar to deflect an indicator attached thereto along an indicating scale at a rate that is directly proportional to differences occurring in the said magnitude of said two fluid pressures being applied to the external surface of said bellows elements in said chambers while said pivotal connection between said lever and said thrust bar enables said control valve to be simultaneously moved at a greater proportional rate than said indicator.

2. A liquid containing system comprising a pair of flexible chambers, an expansible end portion forming a portion of each of said chambers, said end portions being operably arranged to face away from the expansible end portions of the other of said end portions, said chambers having adjacent end portions normally in communication with one another, a passageway normally connecting said chambers, a lever alongside one end of said passageway, a first pivot means connecting one end of said lever to a stationary portion of said system, a second pivot means connecting the other end of said lever to one end portion of a control valve element that extends through and is axially movable in said passageway, a bar operably connected to one of said bellows at one of its ends and to a portion of the lever that is adjacent said first pivot means adjacent its other end, said bar being operative to deflect said lever and said control valve element connected thereto in accordance with the expansion and contraction of said expansible end portions when fluid pressures of different varying magnitude are applied to the interior of a separate chamber wall surrounding and spaced from each of said flexible members, said bar and pivoted lever being connected at a point which produces a movement of said control valve at a greater proportional rate toward a closed or open position than the rate at which each of said expansible end portions is displaced upon an increase or decrease in said difference in magnitude of said applied fluid pressures and said extreme other end of said bar being operably connected to move a deflectible indicating means and indicator attached thereto along an indicating scale at a rate that is proportional to the differences occurring in the magnitude of said fluid pressures applied to each of said separate chambers.

References Cited in the file of this patent

UNITED STATES PATENTS

| | | |
|---|---|---|
| 1,173,038 | Roschanek | Feb. 22, 1916 |
| 2,588,678 | Wills | Mar. 11, 1952 |
| 2,632,474 | Jones | Mar. 24, 1953 |
| 2,659,390 | MacLea et al. | Nov. 17, 1953 |
| 2,672,151 | Newbold | Mar. 16, 1954 |
| 2,700,306 | Johnson | Jan. 25, 1955 |
| 2,762,393 | Reese | Sept. 11, 1956 |